United States Patent
Morris et al.

(10) Patent No.: US 9,016,305 B2
(45) Date of Patent: Apr. 28, 2015

(54) CONFIGURABLE ACTUATION-ORIENTATION VALVE

(75) Inventors: John Michael Morris, Auburn, WA (US); Charles E Stephens, Seattle, WA (US)

(73) Assignee: Norgren GT Development Corporation, Auburn, WA (US)

( * ) Notice: Subject to any disclaimer, the term of this patent is extended or adjusted under 35 U.S.C. 154(b) by 152 days.

(21) Appl. No.: 13/101,332

(22) Filed: May 5, 2011

(65) Prior Publication Data

US 2012/0279589 A1    Nov. 8, 2012

(51) Int. Cl.
| | | |
|---|---|---|
| F15B 13/00 | (2006.01) | |
| F16K 27/02 | (2006.01) | |
| F15B 13/08 | (2006.01) | |
| F16K 31/06 | (2006.01) | |

(52) U.S. Cl.
CPC ........... *F16K 27/029* (2013.01); *F15B 13/0825* (2013.01); *F15B 13/0832* (2013.01); *F15B 13/0857* (2013.01); *F15B 13/0871* (2013.01); *F16K 31/0627* (2013.01)

(58) Field of Classification Search
USPC ............. 137/625.65, 884, 269, 271, 625, 270
See application file for complete search history.

(56) References Cited

U.S. PATENT DOCUMENTS

| | | | | |
|---|---|---|---|---|
| 2,886,063 | A * | 5/1959 | Ray ........................... | 137/625.27 |
| 3,022,799 | A * | 2/1962 | Padula ..................... | 137/625.65 |
| 3,285,285 | A * | 11/1966 | Bielefeld ................ | 137/625.65 |
| 3,972,505 | A * | 8/1976 | Padula ..................... | 251/129.15 |
| 3,993,091 | A | 11/1976 | Loveless | |
| 4,102,526 | A * | 7/1978 | Hargraves ................ | 251/129.21 |
| 4,443,775 | A * | 4/1984 | Fujitani et al. ................. | 335/281 |
| 4,756,331 | A * | 7/1988 | Stegmaier ...................... | 137/271 |
| 5,497,806 | A * | 3/1996 | Swank et al. ............ | 137/625.65 |
| 5,522,424 | A * | 6/1996 | Dalton et al. .................. | 137/560 |
| 5,669,406 | A | 9/1997 | Gluf, Jr. | |
| 5,704,395 | A * | 1/1998 | Kim .......................... | 137/625.65 |
| 6,065,487 | A | 5/2000 | Watson | |
| 6,073,907 | A | 6/2000 | Schreiner, Jr. et al. | |
| 6,209,563 | B1 * | 4/2001 | Seid et al. .................. | 137/15.21 |
| 6,684,896 | B2 * | 2/2004 | Weiss et al. ................ | 137/15.18 |
| 6,708,725 | B2 * | 3/2004 | Entwistle et al. ........ | 137/625.65 |
| 6,772,791 | B2 * | 8/2004 | Neff ......................... | 137/625.65 |
| 7,106,158 | B2 * | 9/2006 | Forsythe et al. .............. | 335/220 |
| 7,210,501 | B2 * | 5/2007 | Neff et al .................. | 137/625.65 |

(Continued)

FOREIGN PATENT DOCUMENTS

EP    0953794 B1    8/2004

*Primary Examiner* — John Rivell
*Assistant Examiner* — Umashankar Venkatesan
(74) *Attorney, Agent, or Firm* — The Ollila Law Group LLC

(57) ABSTRACT

A configurable actuation-orientation valve (100) includes a valve body (120) including a valve bore (126) and a coil (180), a first port (101) and a third port (103) located at a first end (111) and a second port (102) located at a second end (112), a pole piece (138), an armature (130) configured to move in response to energization of the coil (180), and a biasing device (135) between the pole piece (138) and the armature (130). When the biasing device (135) is selected to provide a normally-closed biasing force to the armature (130) then the configurable actuation-orientation valve (100) comprises a normally-closed (NC) valve and when the biasing device (135) is selected to provide a normally-open biasing force to the armature (130) then the configurable actuation-orientation valve (100) comprises a normally-open (NO) valve.

16 Claims, 9 Drawing Sheets

NORMALLY-CLOSED (NC) CONFIGURATION

NORMALLY-OPEN (NO) CONFIGURATION

(56) References Cited

U.S. PATENT DOCUMENTS 7,938,145 B2 * 5/2011 Phillips et al. ................ 137/884
2006/0219305 A1 * 10/2006 Bordonaro et al. ...... 137/625.65
2007/0175529 A1 * 8/2007 Wang et al. .............. 137/625.65
2007/0246100 A1 * 10/2007 Stephens et al. .............. 137/382

* cited by examiner

NORMALLY-CLOSED (NC) CONFIGURATION

NC CONFIGURATION

NORMALLY-OPEN (NO) CONFIGURATION

FIG. 8 NORMALLY-OPEN (NO) CONFIGURATION

CONFIGURABLE ACTUATION-ORIENTATION VALVE

BACKGROUND OF THE INVENTION

1. Field of the Invention

The invention is related to the field of valves, and more particularly, to a configurable actuation-orientation valve.

2. Description of the Prior Art

Solenoid valves are used in a variety of applications. One widespread use is in a valve island comprising a base structure or manifold including one or more common conduits and one or more electrical power connections. The one or more common conduits can comprise supply conduits, exhaust conduits, or other conduits that can be coupled to valves installed to the valve island. Valves can be added to or removed from the valve island. Additional conduits can interconnect valves of the valve island and can connect the valves to various external devices.

Valves can have either a normally-open (NO) functionality or a normally-closed (NC) functionality. In a NO valve, the valve mechanism is normally open and allows fluid flow in the absence of solenoid energization. In contrast, in the NC valve mechanism, fluid flow is only allowed in the presence of solenoid energization.

There exists a need for valves that can be either NC or NO, but still interchangeably fit to a valve island. Further, there exists a need for valves that can be easily and economically manufactured with either NO or NC functionality and while using common parts.

ASPECTS OF THE INVENTION

In some aspects of the invention, a valve island comprises:
a base configured to receive multiple valve units;
a supply conduit that supplies pressurized fluid; and
at least one configurable actuation-orientation valve installed into the base and in fluid communication with the supply conduit;
wherein the at least one configurable actuation-orientation valve regulates the provision of pressurized fluid from the supply conduit as a normally-closed (NC) valve if installed into the base with a first port in communication with the supply conduit or wherein the at least one configurable actuation-orientation valve regulates the provision of pressurized fluid from the supply conduit as a normally-open (NO) valve if installed into the base with a second port in communication with the supply conduit.

Preferably, the at least one configurable actuation-orientation valve comprises a valve body including a valve bore and a coil formed around a portion of the valve bore, with the valve body including a first port and a third port located at a first end and in communication with the valve bore and further including a second port located at a second end and in communication with the valve bore, a pole piece positioned in the valve bore and including a pole piece passage, an armature configured to move toward the pole piece within the valve bore in response to energization of the coil, and a biasing device located in the valve bore between the pole piece and the armature, wherein when the biasing device is selected to provide a normally-closed biasing force to the armature then the configurable actuation-orientation valve comprises a normally-closed (NC) valve, and wherein when the biasing device is selected to provide a normally-open biasing force to the armature then the configurable actuation-orientation valve comprises a normally-open (NO) valve.

Preferably, further comprising over-molding encompassing at least part of the valve body.

Preferably, further comprising two or more bracket portions configured to be assembled to an exterior of the valve body, a bracket ring configured to hold the two or more bracket portions to the exterior of the valve body, and over-molding encompassing at least part of the valve body and at least part of the two or more bracket portions.

Preferably, with the valve being configured as the NC valve further comprising an exhaust shield positioned in the second port and configured to substantially prevent foreign matter from entering the second port, wherein the first port is the input port, and the biasing device being selected to provide the NC biasing force to the armature, wherein the armature is biased against a valve seat of the first port due to the NC biasing force when the coil is not energized and allows fluid flow through the pole piece passage and the second port, and wherein the armature is moved away from the valve seat when the coil is energized, allowing fluid flow between the first port and the third port.

Preferably, when the coil is energized, the armature is moved against the pole piece and blocks the pole piece passage and the second port.

Preferably, with the valve being configured as the NO valve further comprising an exhaust shield positioned in the first port and configured to substantially prevent foreign matter from entering the first port, wherein the second port is the input port, and the biasing device being selected to provide the NO biasing force to the armature, wherein the armature is biased away from the pole piece due to the NO biasing force when the coil is not energized, allowing fluid flow between the second port and the third port, and wherein the armature is moved against the pole piece and blocks the pole piece passage and the second port when the coil is energized, allowing fluid flow between the first port and the third port.

Preferably, the at least one configurable actuation orientation valve includes a second configurable actuation orientation valve, wherein the second configurable actuation orientation valve is installed into the base as a NC valve with the first port in communication with the supply conduit or wherein the second configurable actuation orientation valve is installed into the base as a NO valve with the second port in communication with the supply conduit.

In some aspects of the invention, a method of providing a valve island comprises:
providing a base configured to receive multiple valve units;
providing a supply conduit that supplies pressurized fluid; and
installing at least one configurable actuation-orientation valve into the base and in fluid communication with the supply conduit;
wherein the at least one configurable actuation-orientation valve regulates the provision of pressurized fluid from the supply conduit as a normally-closed (NC) valve if installed into the base with a first port in communication with the supply conduit or wherein the at least one configurable actuation-orientation valve regulates the provision of pressurized fluid from the supply conduit as a normally-open (NO) valve if installed into the base with a second port in communication with the supply conduit.

Preferably, providing the at least one configurable actuation-orientation valve comprises providing a valve body including a valve bore and a coil formed around a portion of the valve bore, with the valve body including a first port and a third port located at a first end and in communication with the valve bore and further including a second port located at a second end and in communication with the valve bore, providing a pole piece positioned in the valve bore and including a pole piece passage, providing an armature configured to move toward the pole piece within the valve bore in response to energization of the coil, and providing a biasing device located in the valve bore between the pole piece and the armature, wherein when the biasing device is selected to provide a normally-closed biasing force to the armature then the configurable actuation-orientation valve comprises a normally-closed (NC) valve, and wherein when the biasing device is selected to provide a normally-open biasing force to the armature then the configurable actuation-orientation valve comprises a normally-open (NO) valve.

Preferably, further comprising over-molding at least part of the valve body.

Preferably, further comprising providing two or more bracket portions configured to be assembled to an exterior of the valve body, providing a bracket ring configured to hold the two or more bracket portions to the exterior of the valve body, and over-molding at least part of the valve body and at least part of the two or more bracket portions.

Preferably, with the valve being configured as the NC valve further comprising positioning an exhaust shield in the second port to substantially prevent foreign matter from entering the second port, wherein the first port is the input port, and selecting the biasing device to provide the NC biasing force to the armature, wherein the armature is biased against a valve seat of the first port due to the NC biasing force when the coil is not energized and allows fluid flow through the pole piece passage and the second port, and wherein the armature is moved away from the valve seat when the coil is energized, allowing fluid flow between the first port and the third port.

Preferably, when the coil is energized, the armature is moved against the pole piece and blocks the pole piece passage and the second port.

Preferably, with the valve being configured as the NO valve further comprising positioning an exhaust shield in the first port to substantially prevent foreign matter from entering the first port, wherein the second port is the input port, and selecting the biasing device to provide the NO biasing force to the armature, wherein the armature is biased away from the pole piece due to the NO biasing force when the coil is not energized, allowing fluid flow between the second port and the third port, and wherein the armature is moved against the pole piece and blocks the pole piece passage and the second port when the coil is energized, allowing fluid flow between the first port and the third port.

Preferably, the at least one configurable actuation orientation valve includes a second configurable actuation orientation valve, wherein the second configurable actuation orientation valve is installed into the base as a NC valve with the first port in communication with the supply conduit or wherein the second configurable actuation orientation valve is installed into the base as a NO valve with the second port in communication with the supply conduit.

BRIEF DESCRIPTION OF THE DRAWINGS

The same reference number represents the same element on all drawings. It should be understood that the drawings are not necessarily to scale.

DETAILED DESCRIPTION OF THE INVENTION

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
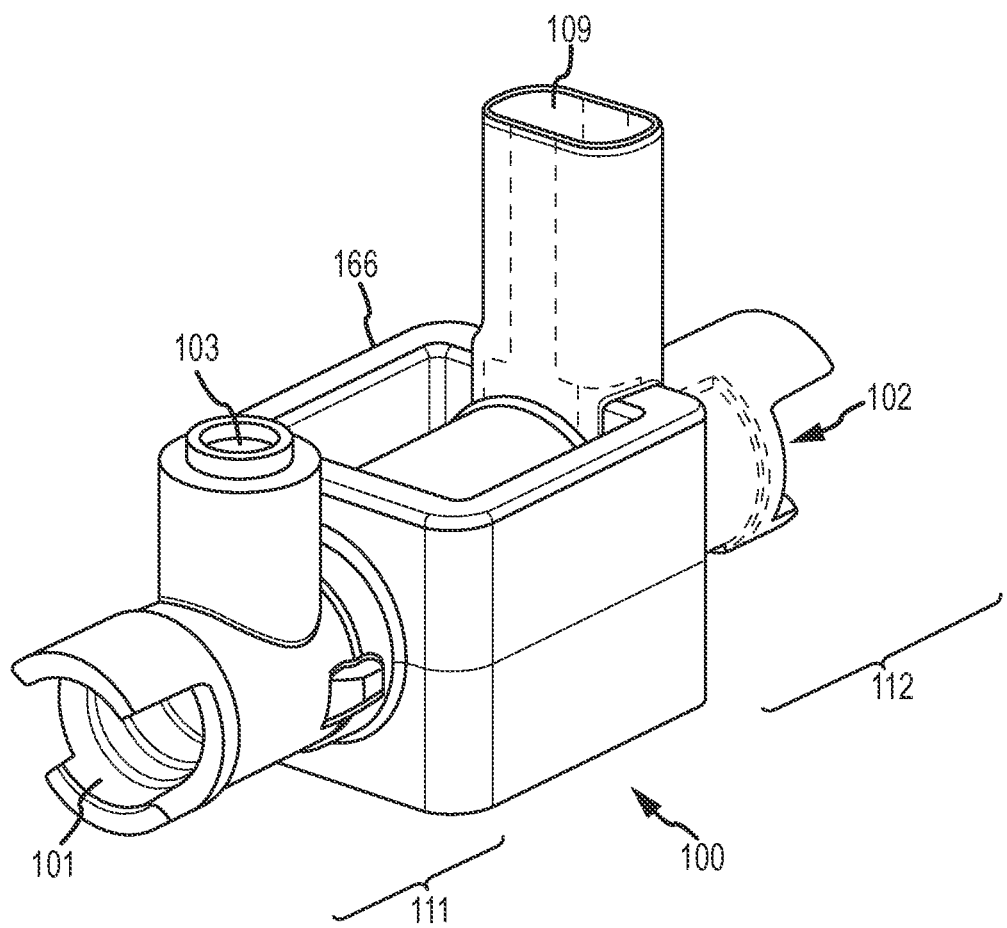
FIG. 1 shows a configurable actuation-orientation valve according to the invention that can be assembled to comprise a normally-open (NO) valve or a normally-closed (NC) valve.

FIG. 1 shows a configurable actuation-orientation valve 100 according to the invention that can be assembled to comprise a normally-open (NO) valve or a normally-closed (NC) valve. The configurable actuation-orientation valve 100 comprises a configurable three port valve 100. The configurable actuation-orientation valve 100 can regulate the provision of pressurized fluid to other devices or components. The fluid can comprise a liquid, a gas, or a mixture. The fluid can comprise pneumatic air, for example.

The configurable actuation-orientation valve 100 includes a first end 111 and a second end 112. The first end 111 includes a first port 101 and a third port 103. The second end includes a second port 102 and an electrical port 109. It should be understood that the positions of the ports are not strictly fixed and the ports may be in various locations and orientations from those depicted in the figure.

The configurable actuation-orientation valve 100 may comprise a valve for use in a valve island or multiple valve manifold environment. Consequently, in some embodiments the first port 101 and the second port 102 may be substantially coaxial and co-linear, wherein the first port 101 and the second port 102 may fit to common conduits of a valve island or valve manifold (see FIG. 9). The first port 101 and the second port 102 may include features (such as the cut-outs shown) that assist in providing proper alignment.

In some embodiments, the valve 100 comprises a solenoid valve including a coil 180. The solenoid actuates the valve mechanism of the valve 100. The valve mechanism can be actuated as a normally-closed valve, wherein the valve mechanism remains closed when the solenoid is not energized and wherein energization of the solenoid opens the valve mechanism. The valve mechanism can be actuated as a normally-open valve, wherein the valve mechanism remains open when the solenoid is not energized and wherein energization of the solenoid closes the valve mechanism.

In some embodiments, the electrical port 109 includes electrical connectors that provide electrical power to an internal solenoid assembly, wherein electrical power can be used to actuate the valve mechanism of the configurable actuation-orientation valve 100.

The figure shows a fully assembled configurable actuation-orientation valve 100 according to at least some of the embodiments of the invention. The fully assembled configurable actuation-orientation valve 100 in the embodiment shown includes an over-molding 166 that fixes the components together. The over-molding 166 may also be protective in nature, protecting the configurable actuation-orientation valve 100 from vibration, shocks, temperature extremes, dirt and moisture, and other environmental conditions.

U.S. Pat. No. 7,106,158 to Forsythe et al. is herein incorporated by reference in its entirety.

Figure 2:
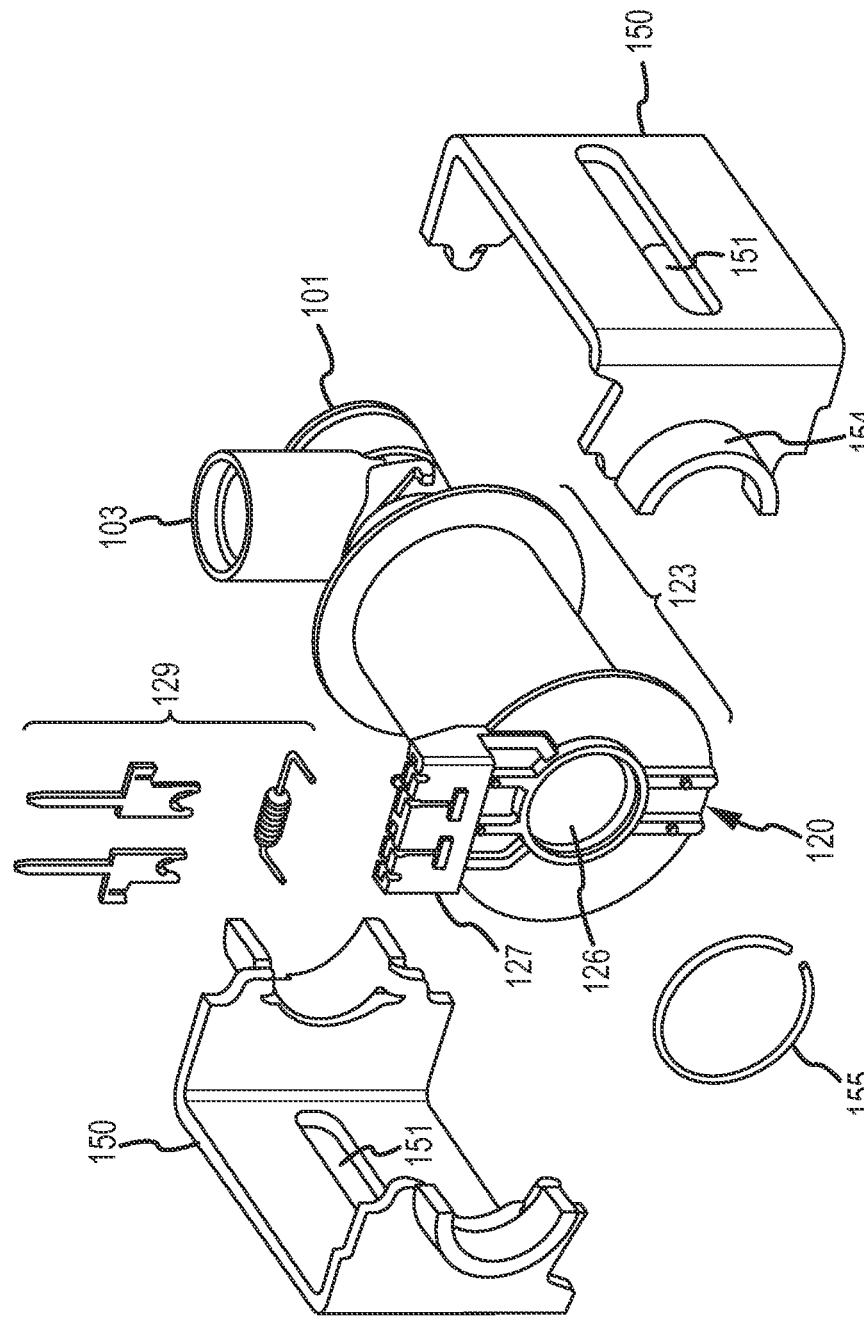
FIG. 2 is an exploded view of the configurable actuation-orientation valve showing a portion of the internal components.

FIG. 2 is an exploded view of the configurable actuation-orientation valve 100 showing a portion of the internal components. The configurable actuation-orientation valve 100 includes a valve body 120 that is the core of the valve 100. The valve body 120 includes a valve bore 126 that receives valve components. The valve bore 126 may extend fully through the valve body 120. The valve bore 126 may be smooth or may have portions of differing diameters. The valve bore 126 may be circular or may comprise other shapes, such as elliptical or rectangular, as desired. The valve bore 126 in the embodiment shown is substantially coaxial with a central axis, but alternatively the valve bore 126 may be offset from the central axis. At one end, the valve body 120 includes the first port 101. The third port 103 in the embodiment shown intersects the valve bore 126 at or near the first port 101 and the third port communicates with the valve bore 126 (see FIGS. 5-9).

Figure 5:
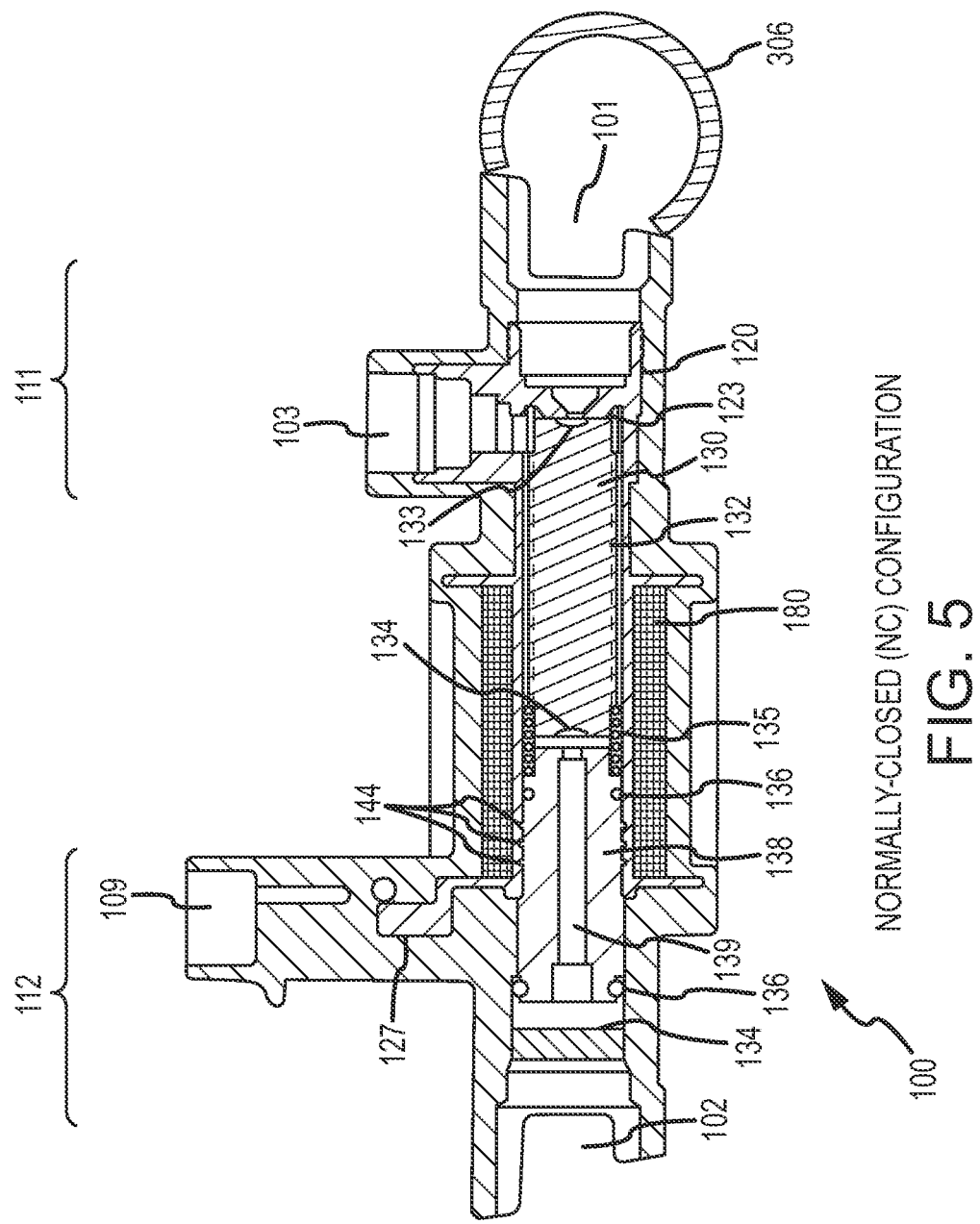
FIG. 5 is a cross-sectional view of the configurable actuation-orientation valve in a NC configuration.

The valve body 120 further may include a spool portion 123 that is configured to receive a coil 180 of a solenoid (see FIG. 5, for example). The valve body 120 may include an electrical port riser 127 that comprises part of the electrical port 109. Electrical port components 129 are assembled to the electrical port riser 127 and form part of the electrical port 109. The electrical port components 129 are coupled to the coil 180 when the coil 180 is in position in the spool portion 123 of the valve body 120.

Two or more bracket portions 150 are configured to be assembled to an exterior of the valve body 120. Two bracket portions 150 are shown in the figure, but any desired number of bracket portions 150 may be used. The two or more bracket portions 150 fit to ends of the valve body 120. A bracket ring 155 may be assembled to the two or more bracket portions 150. The two or more bracket portions 150 are held to the valve body 120 by the bracket ring 155 before the over-molding 166 is applied (see FIG. 3). The over-molding 166 encompasses at least part of the valve body 120 and at least part of the two or more bracket portions 150, wherein the over-molding holds the components together and in some embodiments completes the configurable actuation-orientation valve 100. The two or more bracket portions 150 may further include slots 151 that enable the over-molding 166 to pass through the two or more bracket portions 150.

Figure 3:
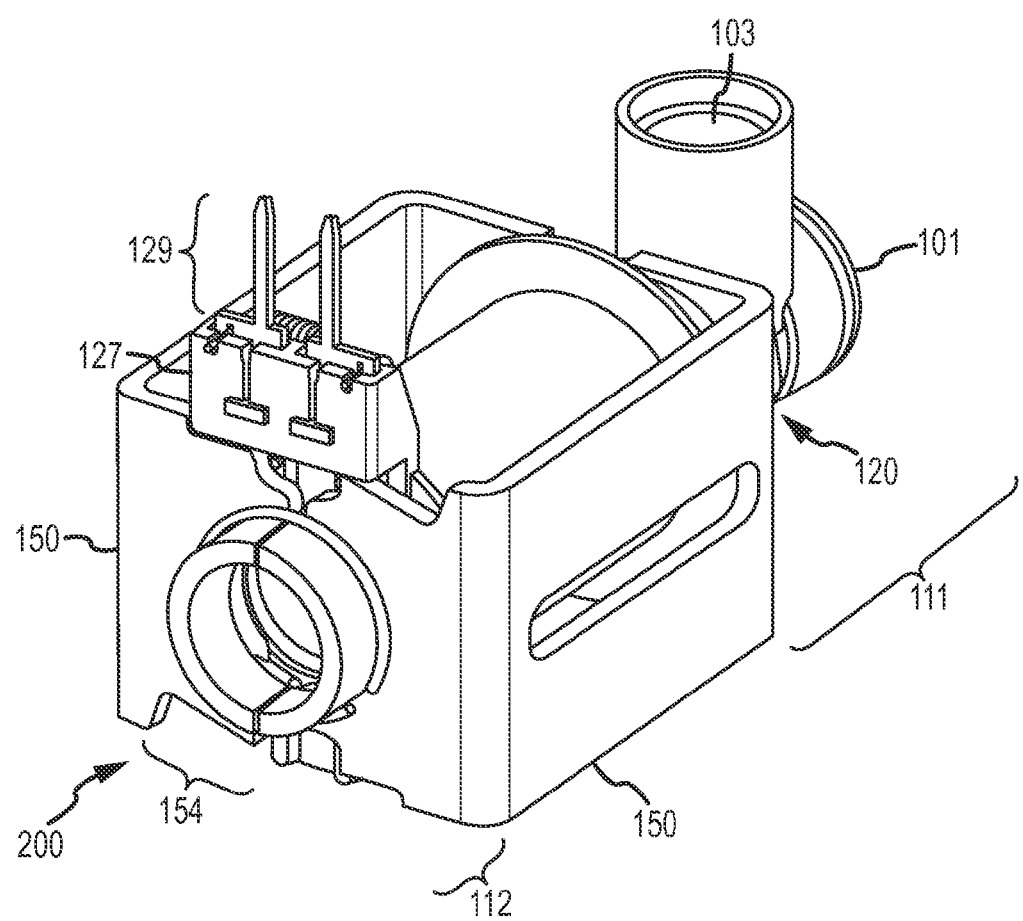
FIG. 3 shows the components of FIG. 2 assembled together to form a valve sub-assembly.

FIG. 3 shows the components of FIG. 2 assembled together to form a valve sub-assembly 200. The valve sub-assembly 200 is ready for application of the over-molding 166. The electrical port components 129 have been assembled to the electrical port riser 127. The two or more bracket portions 150 have been assembled to the valve body 120. The assembly of the two or more bracket portions 150 forms a flange 154 extending from the two or more bracket portions 150 at the second end 112. The bracket ring 155 has been assembled to the two or more bracket portions 150, fitting over the flange 154 and holding the two or more bracket portions 150 together and also to the valve body 120. At this point in assembly, the over-molding 166 can be applied. Further, the internal valve components (see FIG. 4) can be inserted into the valve bore 126.

The two or more bracket portions 150 in some embodiments may also function as a magnetic circuit. The two or more bracket portions 150 may be formed from a magnetically permeable material that provides a magnetic flux path around the coil 180. Consequently, the two or more bracket portions 150 may enhance the magnetic field created by the coil 180 and may increase the solenoid's power and efficiency.

Figure 4:
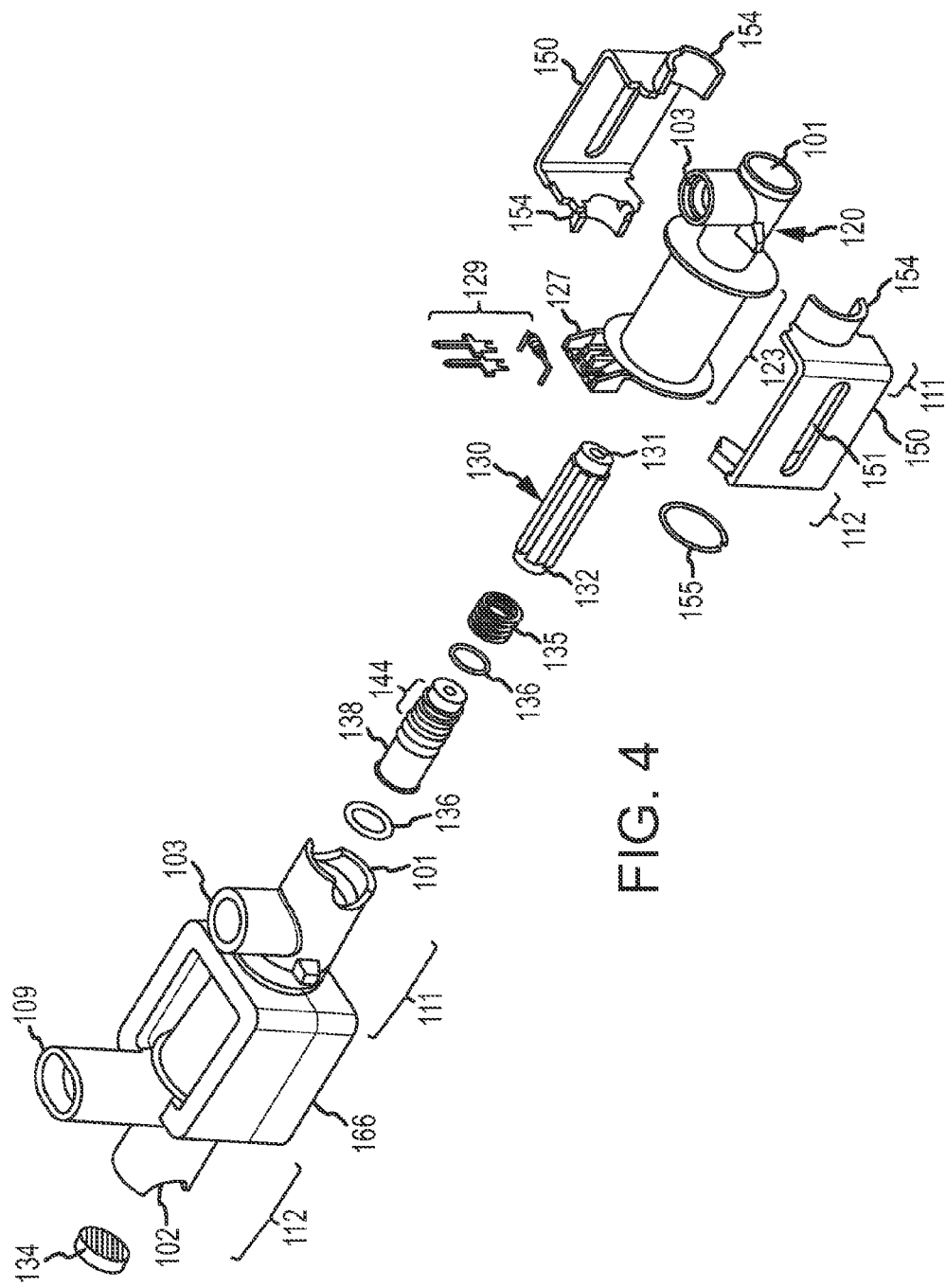
FIG. 4 is an exploded view of the complete configurable actuation-orientation valve in a normally-closed (NC) configuration.

FIG. 4 is an exploded view of the complete configurable actuation-orientation valve 100 in a normally-closed (NC) configuration. In addition to the components in the lower right, comprising the valve sub-assembly 200, the configurable actuation-orientation valve 100 may include an armature 130, a biasing device 135, a pole piece 138, one or more pole piece seals 136, an exhaust shield 134, and the over-molding 166.

The pole piece 138 and the armature 130 are positioned in the valve bore 126 with the biasing device 135 positioned between them. The pole piece 138 is fixed in location within the valve bore 126 and cannot move. One or more projections 144 on the pole piece 138 are designed to press against the interior surface of the valve bore 126 and prevent the pole piece 138 from moving once pressed into place during assembly. One or more pole piece seals 136 are included on the pole piece 138 and seal the pole piece 138 to the valve bore 126.

In some embodiments, the armature 130 includes one or more ribs 132. The one or more ribs 132 create passages or clearance between the armature 130 and the interior surface of the valve bore 126. Consequently, fluid may pass around the armature 130. Alternatively, the one or more ribs 132 may be formed in the interior surface of the valve bore 126 and the armature 130 may be relatively smooth. The one or more ribs 132 may provide guidance for the movement of the armature 130 while allowing fluid flow around the armature 130.

A magnetic gap exists between the armature 130 and the pole piece 138 when assembled into the configurable actuation-orientation valve 100. The magnetic force between the armature 130 and the pole piece 138 is to some extent dependent on the size of the magnetic gap and the magnetic force will decrease if the magnetic gap is increased. The magnetic gap may be set by pressing the pole piece 138 into the valve bore 126 to a predetermined distance.

The over-molding 166 is formed on the valve sub-assembly 200. The over-molding 166 may comprise any suitable over-molding material. The over-molding 166 may be formed over at least a portion of the valve body 120. The over-molding 166 may be formed over the valve body 120 after a coil 180 is formed on the valve body 120. In some embodiments, the over-molding 166 may substantially embed and encompass the valve body 120 except for the openings of the first port 101, the second port 102, the third port 103, and the electrical port 109.

The over-molding 166 may be formed over at least a portion of the two or more bracket portions 150. In some embodiments, the over-molding 166 may substantially completely embed and encompass the two or more bracket portions 150 except for the openings of the second port 102 (formed by the flange 154 formed by the assembled two or more bracket portions 150, see FIG. 3) and the electrical port 109.

The over-molding 166 may be formed on the valve sub-assembly 200 before the armature 130, the biasing device 135, the pole piece 138, and the exhaust shield 134 are provided in the valve sub-assembly 200. Alternatively, the over-molding 166 may be formed on the valve sub-assembly 200 after the armature 130, the biasing device 135, the pole piece 138, and the exhaust shield 134 are inserted into and positioned within the valve bore 126 of the valve body 120. When the configurable actuation-orientation valve 100 is fully assembled, the armature 130, the biasing device 135, the pole piece 138, and the exhaust shield 134 are positioned substantially in the valve bore 126 of the valve body 120, completing the configurable actuation-orientation valve 100.

The configurable orientation capability is provided in the configurable actuation-orientation valve 100 during assembly. The configurable orientation capability comprises the assembly of the common components into either a NC or NO valve. The configurable orientation capability is provided by the selectable biasing device 135. The configurable orientation capability is further provided by supplying the pressurized fluid input at the first port 101 for the NC valve or by supplying the pressurized fluid input at the second port 102 for the NO valve.

The biasing device 135 may be selected to have either a normally-closed (NC) biasing force level or a normally-open (NO) biasing force level, wherein the biasing device 135 applies either a normally-closed biasing force or a normally-open biasing force to the armature 130. The biasing force may be set by the material forming the biasing device 135, by the shape and/or size of the biasing device 135, or by (or including) other factors.

The exhaust shield 134 may be assembled to the second end 112 of the valve bore 126, as shown, and therefore in the second port 102 of the assembled configurable actuation-orientation valve 100. As a result, the exhaust shield 134 will substantially allow fluid to flow out of the second port 102 but will substantially prevent foreign matter from entering the second port 102 (see FIG. 5).

The exhaust shield 134 may alternatively be assembled to the first end 111 of the valve bore 126 and therefore in the first port 101 of the assembled configurable actuation-orientation valve 100. As a result, the exhaust shield 134 will substantially allow fluid to flow out of the first port 101 but will substantially prevent foreign matter from entering the first port 101 (see FIG. 7).

The exhaust shield 134 is sized to fit at least partially into the valve bore 126. The exhaust shield 134 in some embodiments is configured to be press-fit into the valve bore 126, wherein the exhaust shield 134 is held within the valve bore 126 by a friction fit. In addition, the over-molding 166 may in some embodiments be formed to include a ridge or other retaining feature that retains the exhaust shield 134 within the valve bore 126. Alternatively, the exhaust shield 134 may be bonded, welded, or otherwise be permanently or removably affixed within the valve bore 126.

The exhaust shield 134 may be formed of any suitable material. The exhaust shield 134 may be formed of an at least partially resilient or at least partially compressible material in some embodiments.

FIG. 5 is a cross-sectional view of the configurable actuation-orientation valve 100 in a NC configuration. In the NC configuration, the exhaust shield 134 may be positioned in the second port 102. As a result, the first port 101 can comprise an input port. Consequently, the first port 101 may be in fluid communication with a supply conduit 306 (see FIG. 9).

The biasing device 135 in this embodiment comprises a NC biasing device 135 that provides a NC biasing force. The biasing device 135 keeps the armature 130 normally in contact with a valve seat 123 of the valve body 120 and away from the pole piece 138. The NC biasing force will be large enough to prevent fluid pressure at the first port 101 from moving the armature 130 from the substantially fully blocking position that is shown in the figure.

When the coil 180 is not energized, as is shown in the figure, the armature 130 will be at rest, biased to the right in the figure by the biasing device 135. As a result, the NC seal member 133 will sealingly contact the valve seat 123, blocking the first port 101. Consequently, no fluid (liquid, gas, or mixture thereof) will be allowed to flow between the first port 101 and the third port 103. Fluid can flow between the second port 102 and the third port 103.

Figure 6:
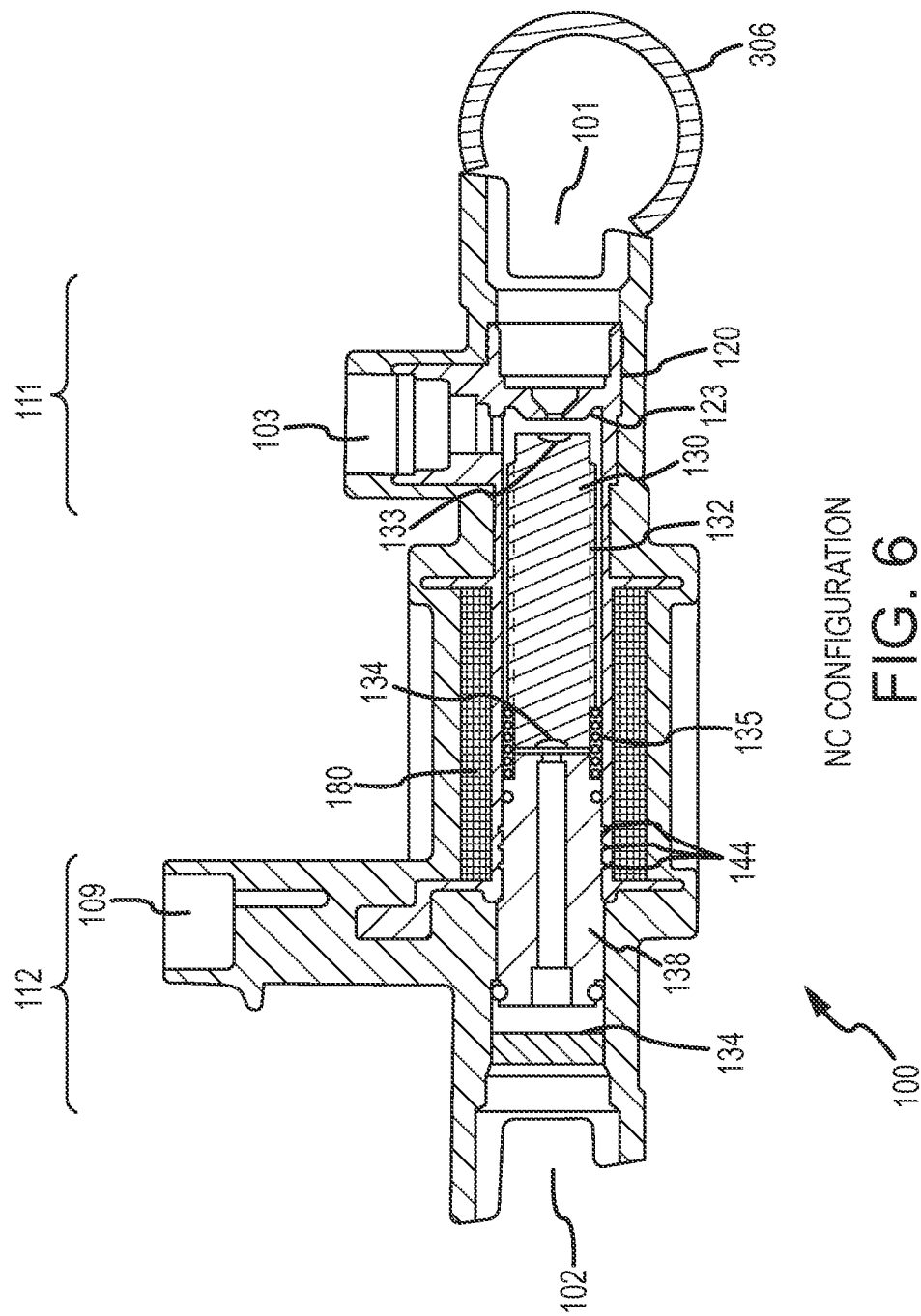
FIG. 6 shows the NC valve of FIG. 5 when the coil is energized.

FIG. 6 shows the NC valve 100 of FIG. 5 when the coil 180 is energized. The magnetic force placed on the armature 130 by the coil 180 will exceed the NC biasing force generated by the biasing device 135. As a result, the armature 130 is moved to the left in the figure, and will remain in that position as long as the coil 180 is energized. Consequently, the NC seal member 133 of the armature 130 is moved away from and unblocks the valve seat 123. Fluid can subsequently flow between the first port 101 and the third port 103. It should be understood that the fluid can flow in either direction, from the first port 101 to the third port 103 or from the third port 103 to the first port 101. In addition, the armature 130 will block the pole piece passage 139 and the second port 102.

Figure 7:
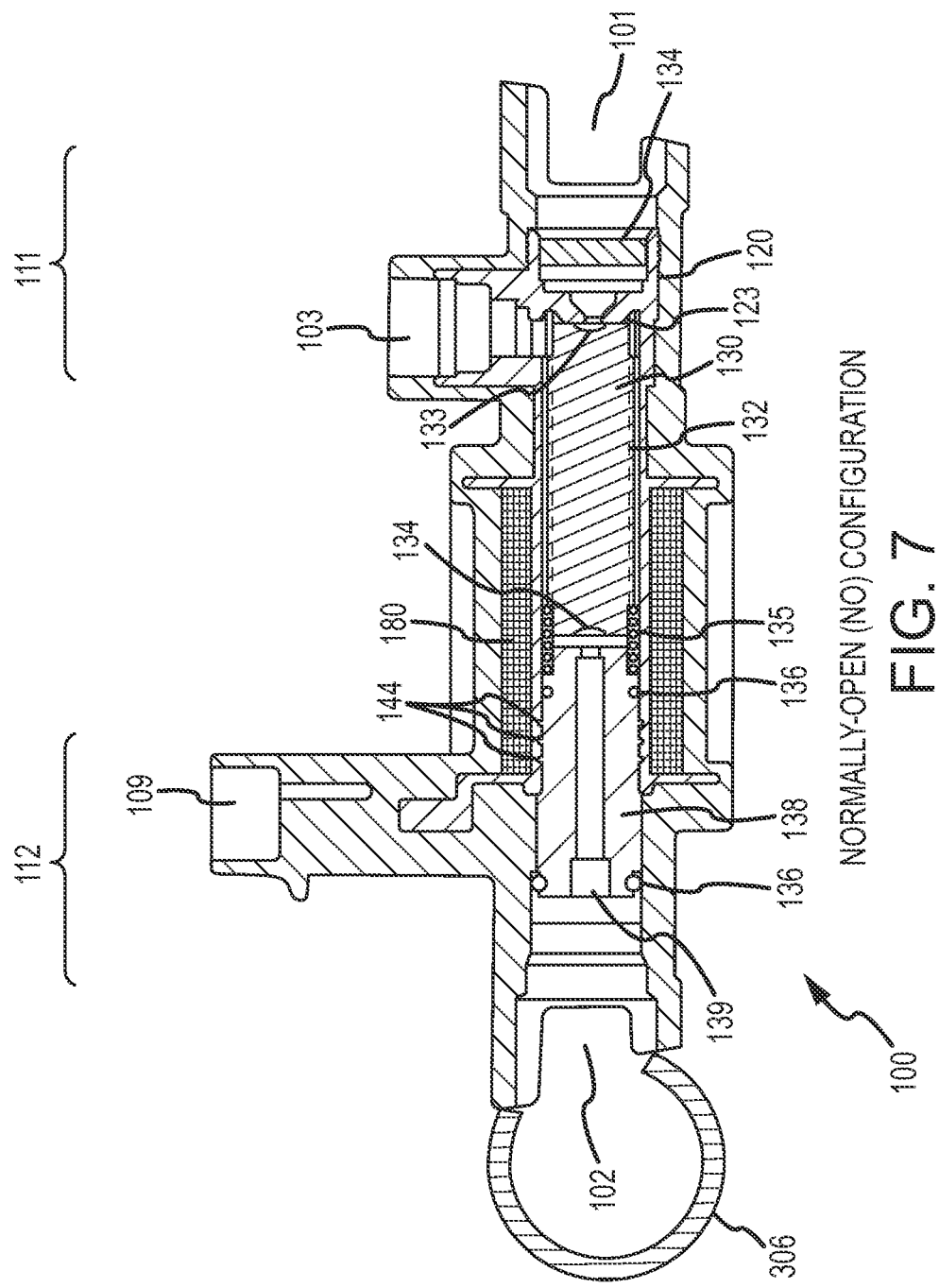
FIG. 7 is a cross-sectional view of the configurable actuation-orientation valve in a NO configuration.

FIG. 7 is a cross-sectional view of the configurable actuation-orientation valve 100 in a NO configuration. In the NO configuration, the exhaust shield 134 may be positioned in the first port 101. As a result, the second port 102 can comprise the input port and may be in fluid communication with the supply conduit 306.

The biasing device 135 in this embodiment comprises a NO biasing device 135 that provides a NO biasing force. The biasing device 135 keeps the armature 130 normally in contact with the valve seat 123 and away from the pole piece 138.

The NO biasing force may be less than a NC biasing force. The NO biasing force must be strong enough to hold the armature 130 to the right in the figure, but the NO biasing force does not need to be as large as the NC biasing force because the first port 101 does not include fluid pressure to be counteracted. Therefore, in some embodiments, the biasing device 135 in the NO configuration may differ from the biasing device 135 in the NC configuration. However, a same biasing device 135 (and same biasing force) may be used in both configurations, if desired.

When the coil 180 is not energized, as is shown in the figure, the armature 130 will be at rest, biased to the right in the figure by the biasing device 135. It should be understood that this is an open position, wherein fluid can travel around the armature 130 and therefore between the second port 102 and the third port 103. Consequently, the pole piece passage 139 is not blocked by the NO seal member 134 and fluid can pass between the second port 102 and the third port 103. It should be understood that the fluid can flow in either direction, from the second port 102 to the third port 103 or from the third port 103 to the second port 102.

Figure 8:
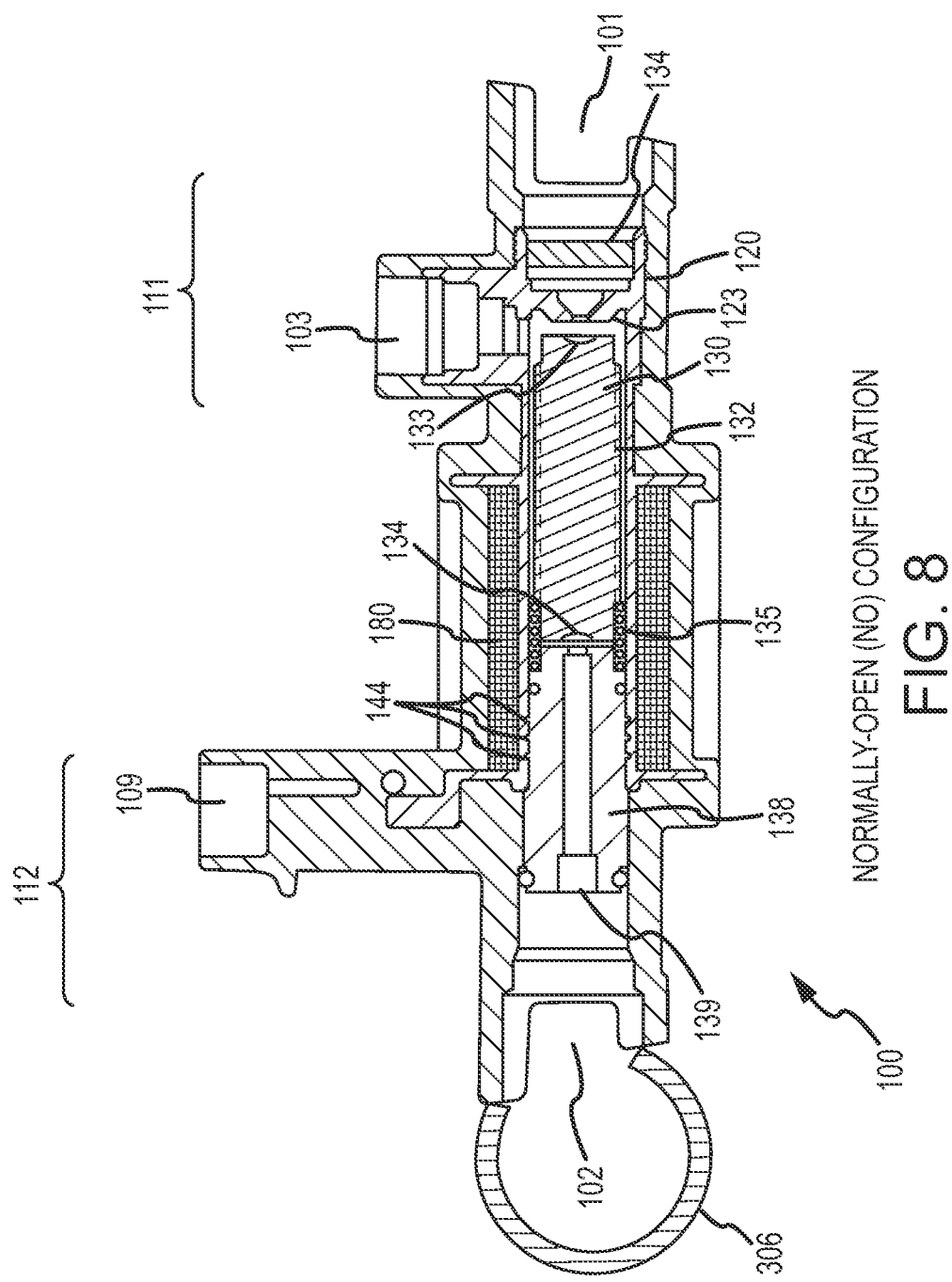
FIG. 8 shows the NO valve of FIG. 7 when the coil is energized.

FIG. 8 shows the NO valve 100 of FIG. 7 when the coil 180 is energized. The magnetic force placed on the armature 130 by the coil 180 will exceed the NO biasing force generated by the biasing device 135. As a result, the armature 130 is moved to the left in the figure, and will remain in that position as long as the coil 180 is energized. Consequently, the NO seal member 134 of the armature 130 is moved against and blocks the pole piece passage 139. No fluid can flow between the second port 102 and the third port 103. Fluid can flow between the first port 101 and the third port 103, however.

In some embodiments, the valve 100 may include a separate and independent valve seat 123 that may be assembled to the valve body 120. As a result, the valve seat 123 may be selected to provide a throat of any desired area and shape.

Figure 9:
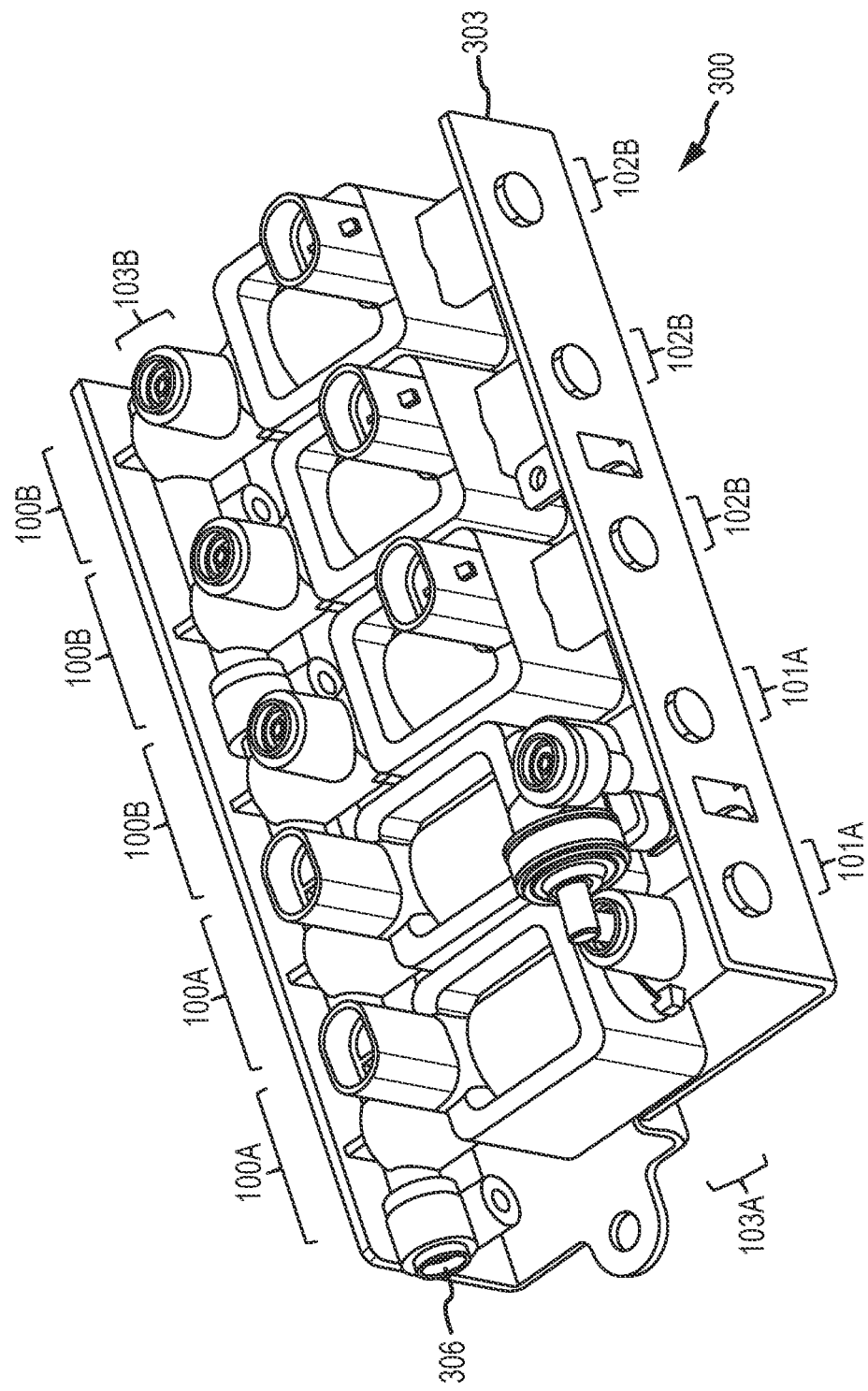
FIG. 9 shows a valve island including a base, one or more common conduits, and one or more configurable actuation-orientation valves.

FIG. 9 shows a valve island 300 including a base 303, one or more common conduits 306, and one or more configurable actuation-orientation valves 100. The one or more common conduits 306 can include a supply conduit 306 that supplies pressurized fluid to the valve island 300 and to the valves installed to the valve island 300. The installed valves can regulate the provision of pressurized fluid to other devices or components. The fluid can comprise a liquid, a gas, or a mixture. The fluid can comprise pneumatic air, for example. The one or more configurable actuation-orientation valves 100 can comprise one or more NO valves 100A and/or one or more NC valves 100B. It should be understood that any number of NO valves and/or NC valves may be installed into the valve island 300. Further, the installed valves may be all NC or all NO in some embodiments. The one or more NO valves 100A are normally open, wherein the second ports 102A are in communication with the conduit 306 when the valves 100A are not energized. The valve 100B may comprise NC valves that are normally closed, wherein the third ports 103B are in communication with the conduit 306 only when the valves 100B are energized.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

We claim:

1. A valve island (300), comprising:
a base (303) configured to receive multiple valve units;
a common conduit (306) configured to supply pressurized fluid to the multiple valve units; and
at least one configurable actuation-orientation valve (100) installed into the base (303) and in fluid communication with the common conduit (306);
wherein the at least one configurable actuation-orientation valve (100) regulates the provision of pressurized fluid from the common conduit (306) as a normally-closed (NC) valve if installed into the base (303) with a first port (101) in communication with the common conduit (306) and wherein the at least one configurable actuation-orientation valve (100) regulates the provision of pressurized fluid from the common conduit (306) as a normally-open (NO) valve if installed into the base (303) with a second port (102) in communication with the common conduit (306);
the configurable actuation-orientation valve (100) is configurable by a selectable biasing device (135) located in a valve bore (126) between a pole piece (138) and an armature (130) wherein the biasing device (135) selectable to prevent the pressurized fluid from moving the armature (130) when the actuation-orientation valve (100) is operating as a normally-closed (NC) valve; and
the first port (101) and the second port (102) are configured with a cutout to fit to the common conduit (306).

2. The valve island (300) of claim 1, with the at least one configurable actuation-orientation valve (100) comprising:
a valve body (120) including the valve bore (126) and a coil (180) formed around a portion of the valve bore (126), with the valve body (120) including the first port (101) and a third port (103) located at a first end (111) and in communication with the valve bore (126) and further including a second port (102) located at a second end (112) and in communication with the valve bore (126);
a pole piece (138) positioned in the valve bore (126) and including a pole piece passage (139);
an armature (130) configured to move toward the pole piece (138) within the valve bore (126) in response to energization of the coil (180); and
wherein when the biasing device (135) is selected to provide a normally-closed biasing force to the armature (130) then the configurable actuation-orientation valve (100) comprises a normally-closed (NC) valve, and wherein when the biasing device (135) is selected to provide a normally-open biasing force to the armature (130) then the configurable actuation-orientation valve (100) comprises a normally-open (NO) valve.

3. The valve island (300) of claim 2, further comprising over-molding (166) encompassing at least part of the valve body (120).

4. The valve island (300) of claim 2, further comprising:
two or more bracket portions (150) configured to be assembled to an exterior of the valve body (120);
a bracket ring (155) configured to hold the two or more bracket portions (150) to the exterior of the valve body (120); and
over-molding (166) encompassing at least part of the valve body (120) and at least part of the two or more bracket portions (150).

5. The valve island (300) of claim 2, with the valve being configured as the NC valve further comprising:
an exhaust shield (134) positioned in the second port (102) and configured to substantially prevent foreign matter from entering the second port (102), wherein the first port (101) is the input port; and
the biasing device (135) being selected to provide the NC biasing force to the armature (130), wherein the armature (130) is biased against a valve seat (123) of the first port (101) due to the NC biasing force when the coil (180) is not energized and allows fluid flow through the pole piece passage (139) and the second port (102), and wherein the armature (130) is moved away from the valve seat (123) when the coil (180) is energized, allowing fluid flow between the first port (101) and the third port (103).

6. The valve island (300) of claim 5, wherein when the coil (180) is energized, the armature (130) is moved against the pole piece (138) and blocks the pole piece passage (139) and the second port (102).

7. The valve island (300) of claim 2, with the valve being configured as the NO valve further comprising:
an exhaust shield (134) positioned in the first port (101) and configured to substantially prevent foreign matter from entering the first port (101), wherein the second port (102) is the input port; and
the biasing device (135) being selected to provide the NO biasing force to the armature (130), wherein the armature (130) is biased away from the pole piece (138) due to the NO biasing force when the coil (180) is not energized, allowing fluid flow between the second port (102) and the third port (103), and wherein the armature (130) is moved against the pole piece (138) and blocks the pole piece passage (139) and the second port (102) when the coil (180) is energized, allowing fluid flow between the first port (101) and the third port (103).

8. The valve island (300) of claim 1, with the at least one configurable actuation orientation valve (100) including a second configurable actuation orientation valve (100), wherein the second configurable actuation orientation valve (100) is installed into the base (303) as a NC valve with the first port (101) in communication with the common conduit (306) or wherein the second configurable actuation orientation valve (100) is installed into the base (303) as a NO valve with the second port (102) in communication with the common conduit (306).

9. A method of providing a valve island, comprising:
providing a base configured to receive multiple valve units;
providing a common conduit that supplies pressurized fluid; and
installing at least one configurable actuation-orientation valve into the base and in fluid communication with the common conduit;
wherein the at least one configurable actuation-orientation valve regulates the provision of pressurized fluid from the common conduit as a normally-closed (NC) valve if installed into the base with a first port in communication with the common conduit and wherein the at least one configurable actuation-orientation valve regulates the provision of pressurized fluid from the common conduit as a normally-open (NO) valve if installed into the base with a second port in communication with the common conduit;
wherein the configurable actuation-orientation valve is configurable by selectable biasing device (135) located in a valve bore (126) between a pole piece (138) and an armature (130) wherein the biasing device (135) selectable to prevent the pressurized fluid from moving the armature (130) when the actuation-orientation valve (100) is operating as a normally-closed (NC) valve; and
the first port (101) and the second port (102) are configured with a cutout to fit to the common conduit (306).

10. The method of claim 9, with providing the at least one configurable actuation-orientation valve comprising:
providing a valve body including the valve bore and a coil formed around a portion of the valve bore, with the valve body including the first port and a third port located at a first end and in communication with the valve bore and further including a second port located at a second end and in communication with the valve bore;
providing a pole piece positioned in the valve bore and including a pole piece passage;
providing an armature configured to move toward the pole piece within the valve bore in response to energization of the coil; and
wherein when the biasing device is selected to provide a normally-closed biasing force to the armature then the configurable actuation-orientation valve comprises a normally-closed (NC) valve, and wherein when the biasing device is selected to provide a normally-open biasing force to the armature then the configurable actuation-orientation valve comprises a normally-open (NO) valve.

11. The method of claim 10, further comprising over-molding at least part of the valve body.

12. The method of claim 10, further comprising:
providing two or more bracket portions configured to be assembled to an exterior of the valve body;
providing a bracket ring configured to hold the two or more bracket portions to the exterior of the valve body; and
over-molding at least part of the valve body and at least part of the two or more bracket portions.

13. The method of claim 10, with the valve being configured as the NC valve further comprising:
positioning an exhaust shield in the second port to substantially prevent foreign matter from entering the second port, wherein the first port is the input port; and
selecting the biasing device to provide the NC biasing force to the armature, wherein the armature is biased against a valve seat of the first port due to the NC biasing force when the coil is not energized and allows fluid flow through the pole piece passage and the second port, and wherein the armature is moved away from the valve seat when the coil is energized, allowing fluid flow between the first port and the third port.

14. The method of claim 13, wherein when the coil is energized, the armature is moved against the pole piece and blocks the pole piece passage and the second port.

15. The method of claim 10, with the valve being configured as the NO valve further comprising:
positioning an exhaust shield in the first port to substantially prevent foreign matter from entering the first port, wherein the second port is the input port; and
selecting the biasing device to provide the NO biasing force to the armature, wherein the armature is biased away from the pole piece due to the NO biasing force when the coil is not energized, allowing fluid flow between the second port and the third port, and wherein the armature is moved against the pole piece and blocks the pole piece passage and the second port when the coil is energized, allowing fluid flow between the first port and the third port.

16. The method of claim 10, with the at least one configurable actuation orientation valve including a second configurable actuation orientation valve, wherein the second configurable actuation orientation valve is installed into the base as a NC valve with the first port in communication with the common conduit or wherein the second configurable actuation orientation valve is installed into the base as a NO valve with the second port in communication with the common conduit.

* * * * *